United States Patent Office 3,427,303
Patented Feb. 11, 1969

3,427,303
PROCESS FOR THE PREPARATION OF CYCLO-
ALKANONE OXIMES AND LACTAMS IN THE
PRESENCE OF STRONG ACIDS
Michailas Genas, Paris, and René Kern, Savigny-sur-
Orge, France, assignors to Societe Organico, a corpora-
tion of France
No Drawing. Filed July 23, 1964, Ser. No. 384,800
Claims priority, application France, July 30, 1963,
943,157
U.S. Cl. 260—239.3      6 Claims
Int. Cl. C07c 131/02

ABSTRACT OF THE DISCLOSURE

The present invention relates to an improved method of preparing oximes and lactams which allows recycling of the concentrated acids used for their preparation.

---

The method of preparing ketoximes by the action of nitrosyl chloride on aliphatic hydrocarbons and on cycloalkanes under the effect of actinic radiation is known. It is also a known fact that the oxime yield is improved when the reaction is effected in the presence of anhydrous hydrochloric acid and strong acids insoluble in the reaction medium, such as sulfuric acid and phosphoric acids. By phosphoric acids are to be understood ortho, pyro, meta and polyphosphoric acids.

The use of strong acids insoluble in the reaction medium has the advantage of dissolving the oximes thus formed and thereby protecting them from secondary reactions. The use of acids which are insoluble in the reaction medium has a further advantage, namely that in the course of the photochemical reaction of nitrosyl chloride on hydrocarbons the transparent surface through which the radiation penetrates into the reaction medium is covered by resinous products. This resinous layer decreases the intensity of radiation and slows down the reaction. The strong acids which are insoluble in the reaction medium, such as sulfuric acid and phosphoric, pyrohposphoric and polyphosphoric acids decrease or prevent the formation of resins on the irradiated surfaces.

From the solutions of oximes in phosphoric or sulfuric acids obtained during the nitrosation reaction, the oximes may be isolated by diluting the solutions with water and separating the oximes by filtering, decanting, or by extraction with solvents. The industrial importance of oximes, in particular the cycloalkanone oximes lies in the fact that they may be converted into lactams, which are primary materials for the manufacture of polyamides.

Sulfuric acid and phosphoric acids are reagents in the transforming of oximes into lactams. If it is desired to transform the oximes obtained by the photochemical nitrosation of the cycloalkanones in the presence of these acids, it is possible to heat the solutions of the oximes directly, i.e., without isolating the oximes formed. In order to isolate the lactams which are formed, the same method may be followed as for the isolation of the oximes viz. to dilute the reaction mixture with water and isolate the lactam by extraction, decanting or filtering.

The sulfuric and phosphoric acids recovered after separation of the oximes or the lactams may be concentrated by distillation of water until the initial concentration is obtained. They are, however, strongly colored by the organic matter which stains them, and their direct reuse for photochemical nitrosation of cycloalkanones is practically impossible. The discarding of these used acids by discharging them into a river or a sewer is forbidden. Consequently, in order to dispose of them, they are generally utilized in the production of chemical manure. This transformation causes considerable complications both from the material and commercial point of view.

The object of the present invention is to provide an improved method of preparing oximes and lactams which consists in treating sulfuric acid and phosphoric acids recovered from the photochemical nitrosation of the cycloalkanes to oximes, or recovered after the transformation into lactams of the oximes in solution in these acids. This treatment has as its aim to render the acids recovered usable for photochemical nitrosation and the production of oximes with a yield similar to that given by a fresh acid. In order to obtain this result it is necessary that the coloration of the reused acid does not exceed a coloration corresponding to the number 5 on the Gardner scale (Gardner and Sward, Physical and Chemical Examination of Paints, Varnishes, Lacquers, and Colors, 10th edition, Gardner Lab., Bethesda, Md., 1946). The improvement consists in concentrating by distillation of water the dilute acids separated from the oximes or the lactams which are obtained, and treating the acids, before reuse, with concentrated nitric acid under heat, either directly or after prior treatment with chlorine. This improvement particularly allows oximes and lactams to be prepared continuously on an industrial scale.

When these recovered and concentrated acids are heated with nitric acid having a concentration between 50 and 100%, a release of nitrous vapours is observed, which results from the destruction of the organic materials. The quantity of nitric acid necessary depends upon the proportion of chlorinated and nitrogenous organic impurities contained in the recovered acids, and the quantity needed for obtaining the desired degree of decolorization can easily be determined by heating samples of recovered acids with different quantities of nitric acid. The necessary quantity of nitric acid, calculated as 100% $HNO_3$, is 5 to 100% relative to the weight of sulfuric or phosphoric acid. A proportion of the order of 10 to 20% is generally sufficient. The excess of acid is not lost, since it may be recovered quantitatively by distillation.

When a mixture of recovered acids is heated with nitric acid under reflux, nitrous vapours appear at about 100° C., their release causing the formation of froth. When the release of nitrous vapours slows down, the temperature is gradually raised to approximately 250° C. In order to moderate the frothing of the solution in the initial stage of the operation, the nitric acid may be introduced gradually.

It is also possible to pre-heat the recovered acids to a temperature of 150° C. to 250° C. and to introduce the nitric acid slowly. At the end of the operation, the excess nitric acid is recovered by distillation. A distillation at 200° C. under a vacuum of 2 mm. of mercury completely eliminates the nitric acid.

In the variant method in which the dilute solution of the acids, recovered after separation from the oximes or the lactams, is first treated with chlorine, a current of chlorine is passed through the solution. Organic products separate in the form of an oil containing chlorinated products. These oils may be easily separated by filtering, decanting or extraction with a solvent such as chloroform or carbon tetrachloride. The chlorine treatment of the acid solution is continued until a filtered sample is no longer made turbid by the passage of chlorine.

The preferred concentration of acids for the treatment with chlorine is 20% to 60% of sulfuric or orthophosphoric acid, which corresponds to the dilutions used for the precipitation of oximes or lactams. The quantity of chlorine required varies from 5 grams to 50 grams for 1 kg. of acid calculated as 100%. The treatment with chlorine may be effected at ambient temperature but the purification is more rapid if it is effected at a higher temperature. Thus, for example, the duration of the operation is approximately 2 hours at ambient temperature and 20 minutes to 1 hour at 85° C.

When the dilute acids are concentrated by water distillation after treatment by chlorine and separation of the oily products, the phosphoric acid obtained is too highly colored for it to be capable of reuse for photochemical nitrosation. It has to be subjected first to treatment under heat with concentrated nitric acid. The object of the intermediate treatment with chlorine is substantially to decrease the quantity of nitric acid necessary for decolorization.

The following examples serve to illustrate the method according to the invention but are not of a limiting character. In order to determine the yields with accuracy, recovery operations were effected as intensively as possible to recover the oxime from the different liquid layers in which it was contained. In industrial operations these complete extractions are not practicable and layers of solvents which contain a small quantity of oxime are used again without extraction.

The first example is given by way of comparison in order to show the decreased yields when the acid is recycled without being treated.

EXAMPLE 1

The apparatus for the photochemical nitrosation reaction comprises a Keller flask having externally silvered walls, with a capacity of 1.5 litres, having four conduits serving respectively for the introduction of a solution of nitrosyl chloride, a thermometer, a tube for the introduction of gaseous hydrochloric acid and a release tube. A 70 watt mercury vapour lamp is located in the neck of the flask. The lamp is provided with a double envelope of Pyrex glass in which cooling water circulates. A magnetic stirrer allows the solution to be mixed.

The reaction flask is filled with 150 grams of cyclododecane in solution in 150 grams of carbon tetrachloride and 50 grams of phosphoric acid of a concentration equivalent to 103% of $H_3PO_4$. The solution is saturated with gaseous HCl. The magnetic stirring is started and the mercury vapour lamp is switched on. While continuing to pass a current of HCl, 0.3 mole of nitrosyl chloride in 10% solution in carbon tetrachloride is gradually introduced over a period of 5 hours. External cooling maintains the flask at a temperature of 15 to 20° C. throughout the operation. Radiation is continued for a further hour after the end of the introduction of the nitrosyl chloride solution. The total radiation period is thus 6 hours.

When the reaction is concluded, the resulting phosphoric layer containing cyclododecanone oxime is decanted. The phosphoric solution is poured into 150 cc. of iced water, and the cyclododecanone oxime is precipitated. The precipitate is filtered and washed on the filter with a small amount of water. The crude cyclododecanone oxime is dried in an oven at 80° C. and then recrystallized in 200 cc. of boiling cyclohexane. 41.5 grams of cyclododecanone oxime are obtained, having a melting point of 134° C. Another 5 grams of cyclododecanone oxime are obtained from the decanted organic solution after washing with two 50 gram portions of phosphoric acid and dilution of the phosphoric layer with water. In all 46.5 grams of oxime have been formed after 6 hours of radiation.

The dilute phosphoric acid recovered from the drying of the first portion of oxime is concentrated by distillation of water under 2 mm. of mercury to the original concentration of 103% of $H_3PO_4$. The acid thus obtained has a coloration of 18 on the Gardner scale. This acid has been reused in a photochemical nitrosation reaction carried out under conditions identical with those hereinbefore described. In 6 hours of radiation a total of 36 grams of cyclododecanone oxime were obtained. The reuse of the phosphoric acid recovered from this operation yielded 35 grams of oxime.

This example illustrates the drop in yield of oxime production when phosphoric acid is reused. This drop in yield is harmful to the economy of the method because of the large quantities of light energy consumed by the reaction.

EXAMPLE 2

A slow current of chlorine is passed for 2 hours into the dilute phosphoric acid recovered by the drying of the first portion of oxime and resulting from an operation identical with that described in Example 1 carried out with fresh phosphoric acid. The oily products formed are separated by filtration. The filtrate is concentrated by water distillation until its content is equivalent to 103% of $H_3PO_4$. The coloration of the phosphoric acid is 8 on the Gardner scale. 5 grams of 95% nitric acid are added, heating is gradually effected to 200° C. under reflux and this temperature is maintained for 2 hours. The excess nitric acid is eliminated at 200° C. under a vacuum of 2 mm. of mercury. The coloration of the phosphoric acid thus obtained is 2 on the Gardner scale.

This phosphoric acid was used for the photonitrosation of cyclododecane in conditions identical with those described in Example 1. 46.5 grams of cyclododecanone oxime are obtained, having a melting point of 134° C. as obtained in Example 1 using fresh phosphoric acid.

EXAMPLE 3

Cyclododecanone oxime is prepared by a method identical with that described in Example 1. The phosphoric solution of cyclododecanone oxime decanted from the reaction mixture is heated at 120° C. for 1 hour. An exothermic reaction which is produced at this temperature is maintained for 30 minutes. After the reaction, the reaction mixture is diluted with 100 cc. of iced water. The dodecanolactam formed is precipitated. The precipitate is extracted with 90 cc. of chloroform in 30 cc. portions. The chloroform extracts are washed in water until neutralized and the solvent is distilled under vacuum. The residue consists of 41 grams of crude dodecanolactam. After recrystallization in 200 cc. of boiling cyclohexane, 39 grams of dodecanolactam with a melting point of 152° C. are obtained.

The aqueous phosphoric layer decanted from the chloroform layer of the lactam is concentrated at 200° C. under vacuum until a concentration of 103% of $H_3PO_4$ is obtained, this acid being black in color. 7.5 grams of 95% nitric acid are added, the mixture is gradually heated under reflux to a temperature of 200° C. and this temperature is maintained for 6 hours. After this time the flask is provided with a condenser and the excess of nitric acid is distilled under a vacuum of 2 mm. of mercury. The phosphoric acid thus obtained is practically colorless.

This phosphoric acid was used for the photonitrosation of the cyclododecane under conditions identical with those described in Example 1. 46.7 grams of cyclododecane oxime, having a melting point of 134° C., were obtained. The yield is thus comparable with that obtained using fresh phosphoric acid.

EXAMPLE 4

Using the photochemical nitrosation apparatus described in Example 1 the flask is filled with one kilogram of pure cyclohexane and 50 grams of phosphoric acid of a concentration of 105% calculated as $H_3PO_4$. The solution is saturated by a current of gaseous HCl, magnetic stirring is effected and the lamp is cooled. Once the lamp is lighted, a solution of 0.3 mole of nitrosyl chloride in 10% solution in carbon tetrachloride is gradually introduced over a period of 5 hours. The temperature of the reaction is maintained at 15° C. to 20° C. by cooling. Radiation is continued for 1 hour after the end of the introduction of the nitrosyl chloride solution. When the reaction is concluded, the phosphoric layer containing the cyclohexanone oxime in solution is decanted. The cyclohexane contains a small quantity of cyclohexanone oxime which is extracted by means of 70% phosphoric acid, so that 2.5 grams of cyclohexanone oxime are thus obtained after dilution of the phosphoric acid to 30% and extraction with chloroform.

The phosphoric layer separated after reaction is poured, dropwise and with stirring, into a flask heated to a temperature of 120° C. The period required for introduction is 30 minutes. After introduction the reaction mixture is kept at a temperature of 120° C. for a further hour. The reaction mixture is diluted with 100 cc. of iced water. The solution obtained is extracted by means of chloroform in a continuous extraction apparatus. 20.1 grams of caprolactam (melting point 67° C. to 69° C.) are thus obtained. The aqueous phosphoric layer, which is black in color, recovered after extraction of the caprolactam by means of chloroform, is treated for 30 minutes with a slow current of chlorine, a temperature of 85° C. being maintained for this period. A heavy oil is formed and is separated by decanting. The aqueous layer is concentrated by water distillation until the phosphoric acid content is 103%. The acid obtained at this stage has a coloration corresponding to 12 on the Gardner scale. This acid is heated to a temperature of 220° C. and 10 grams of 95% nitric acid are introduced dropwise under a slight reflux. After 2½ hours of heating the acid loses its color. The excess nitric acid is eliminated by distillation under vacuum.

The phosphoric acid thus obtained and reused in the photochemical nitrosation reaction gives the same yield of cyclohexanone oxime as fresh phosphoric acid.

EXAMPLE 5

The photonitrosation apparatus is that described in Example 1.

The reaction flask is filled with 150 grams cyclododecane in solution in 1500 grams of carbon tetrachloride and 50 grams of 98% sulfuric acid. The solution is saturated with a current of gaseous HCl. Magnetic stirring is commenced and the mercury vapour lamp is lighted, and the lamp and the flask are cooled by a current of cold water so as to maintain a temperature of 15° C. to 20° C. throughout the reaction. While continuing to pass the current of hydrochloric acid, 0.3 mole of nitrosyl chloride in 10% solution in carbon tetrachloride is gradually introduced over a period of 5 hours.

Radiation is continued for 1 hour after introduction of the nitrosyl chloride solution has been concluded. The total period of radiation is 6 hours. When the reaction is concluded, the residue of the layer containing the cyclododecanone oxime is decanted. The organic solution is extracted with two portions of 50 grams of 70% sulfuric acid. After diluting the extract in cold water 5 grams of cyclododecanone oxime are recovered. The sulfuric solution of cyclododecanone oxime decanted from the reaction mixture is poured dropwise while being stirred into a flask maintained at a temperature of 120° C. by means of an oil bath. The introductory period lasts 30 minutes and after introduction the reaction mixture is kept at a temperature of 120° C. for one hour. The reaction mixture is diluted with 100 cc. of iced water, the precipitate formed is extracted with 90 cc. of chloroform in portions of 30 cc. The chloroform extracts are washed in water until neutralized and the solvent is distilled under vacuum. The residue consists of 37.5 grams of crude dodecanolactam. After recrystallization in 200 cc. of boiling cyclohexane, 35.6 grams of dodecanolactam, melting at 153° C. are obtained. The aqueous sulfuric layer decanted from the chloroform extract of the lactam is concentrated at 150° C. under a reduced pressure of 2 mm. of mercury. The acid thus obtained is black.

This acid is heated to a temperature of between 180° C.–200° C. and 7.5 g. of 95% nitric acid are introduced dropwise while maintaining a slight reflux. After being heated for 1½ hours the acid becomes colorless. The excess nitric acid is eliminated by distillation under vacuum.

The sulfuric acid thus obtained yields the same amount of cyclododecanone oxime in a photochemical nitrosation reaction as does fresh sulfuric acid.

What we claim is:

1. A continuous process for the production of lactams which comprises the following steps:
   (a) reacting under the effect of actinic radiation a cycloaliphatic hydrocarbon and a nitrosyl halide in the presence of gaseous hydrohalic acid and a strong acid which is insoluble in said reaction medium to thereby form an oxime in solution with said strong acid;
   (b) removing the strong acid solution of the oxime from the reaction medium by decantation;
   (c) heating said oxime solution to form the corresponding lactam in solution with the strong acid;
   (d) diluting the solution of the lactam and strong acid so as to precipitate the lactam;
   (e) separating the precipitated lactam from the diluted strong acid solution;
   (f) treating the diluted strong acid at a temperature from about 20° C. to 100° C. with chlorine to form chlorinated oils and removing said oils;
   (g) concentrating the strong acid solution by distillation;
   (h) contacting the strong acid solution with from 5% to 100% of nitric acid, calculated on the basis of 100% $HNO_3$, by weight relative to the weight of the concentrated strong acid at a temperature of from about 100° C. to 250° C. to decolorize and remove impurities from the strong acid and removing excess nitric acid by distillation;
   (i) recycling the decolorized and purified strong acid solution to a reaction medium similar to that set forth in step (a) for the further production of lactam.

2. The process of claim 1 wherein the nitric acid for the decolorizing and purifying step (h) is introduced into the concentrated strong acid while the latter is at a temperature of 150° C. to 250° C.

3. The process of claim 1 wherein the chlorinated oils of step (f) are removed from the strong acid solution by decantation.

4. The process of claim 1 wherein the strong acid is sulfuric acid.

5. The process of claim 1 wherein the strong acid is phosphoric acid.

6. A continuous process for the preparation of an oxime which is to be subsequently used in the production of its corresponding lactam, said process comprising the following steps:
   (a) reacting under the effect of actinic radiation a cycloaliphatic hydrocarbon and a nitrosyl halide in the presence of gaseous hydrohalic acid and a strong acid which is insoluble in said reaction medium to thereby form an oxime in solution with said strong acid;
   (b) removing the strong acid solution of the oxime from the reaction medium by decantation;
   (c) diluting the oxime solution as obtained from step (b) to thereby isolate said oxime;
   (d) separating the isolated oxime from the diluted strong acid;
   (e) treating the diluted strong acid at a temperature of from about 20° C. to 100° C. with chlorine to form chlorinated oils and decanting said oils;
   (f) concentrating the diluted and treated strong acid solution by distillation;
   (g) contacting the strong acid solution with from 5% to 100% of nitric acid, calculated on the basis of 100% $HNO_3$, by weight relative to the weight of the concentrated strong acid at a temperature of from about 100° C. to 250° C. to decolorize and remove impurities from the strong acid and removing excess nitric acid by distillation;

(h) recycling the decolorized and purified strong acid solution for further reaction with cycloaliphatic hydrocarbon.

References Cited

UNITED STATES PATENTS

| | | | |
|---|---|---|---|
| 2,069,472 | 2/1937 | Duffard | 23—172 |
| 2,390,316 | 12/1945 | Mattern | 23—172 |
| 2,643,938 | 6/1953 | Robinson | 23—172 |
| 2,847,285 | 8/1958 | Pahud | 23—165 |
| 2,849,280 | 8/1958 | Le Baron et al. | 23—165 |
| 2,955,920 | 10/1960 | Belchetz | 23—172 |
| 3,060,173 | 10/1962 | Van Schick et al. | 260—239.3 |
| 3,090,739 | 5/1963 | Ito | 260—239.3 |
| 3,239,508 | 5/1966 | Ito et al. | 260—239.3 |

FOREIGN PATENTS

| | | |
|---|---|---|
| 17,380 | 5/1934 | Australia. |
| 816,290 | 7/1959 | Great Britain. |
| 865,711 | 4/1961 | Great Britain. |

HENRY R. JILES, *Primary Examiner.*

R. T. BOND, *Assistant Examiner.*

U.S. Cl. X.R.

260—294.7, 326.5; 23—165, 172